Oct. 31, 1933.    H. H. COLE    1,932,691
AUTOMATIC CAMERA
Filed May 7, 1931    2 Sheets-Sheet 1

HARRY H. COLE
INVENTOR.

BY

ATTORNEY.

Oct. 31, 1933.    H. H. COLE    1,932,691
AUTOMATIC CAMERA
Filed May 7, 1931    2 Sheets-Sheet 2

HARRY H COLE
INVENTOR.

BY Ronald M. Adams

ATTORNEY.

Patented Oct. 31, 1933

1,932,691

UNITED STATES PATENT OFFICE 1,932,691

AUTOMATIC CAMERA

Harry H. Cole, Eagle River, Wis., assignor of three-fourths to August H. Meyer, Oshkosh, Wis.

Application May 7, 1931. Serial No. 535,687

2 Claims. (Cl. 88—19.3)

The present invention relates to an automatic camera.

An object of the invention is to provide a camera for automatically taking a number of still pictures on a strip of film.

Another object is to provide a camera for taking a succession of still pictures at equally spaced time intervals.

A further object is to provide an automatic shutter mechanism for making a series of successively timed exposures of different predetermined time values and to repeat this series of exposures consecutively during the operation of the camera.

A further object is to provide a focal plane tube, shutter and lens mount assembly in unit form which is interchangeable and being such as to maintain critical dimensions permanently accurate.

Other objects will be apparent from the following description and claims.

In the accompanying drawings.

Figure 1:
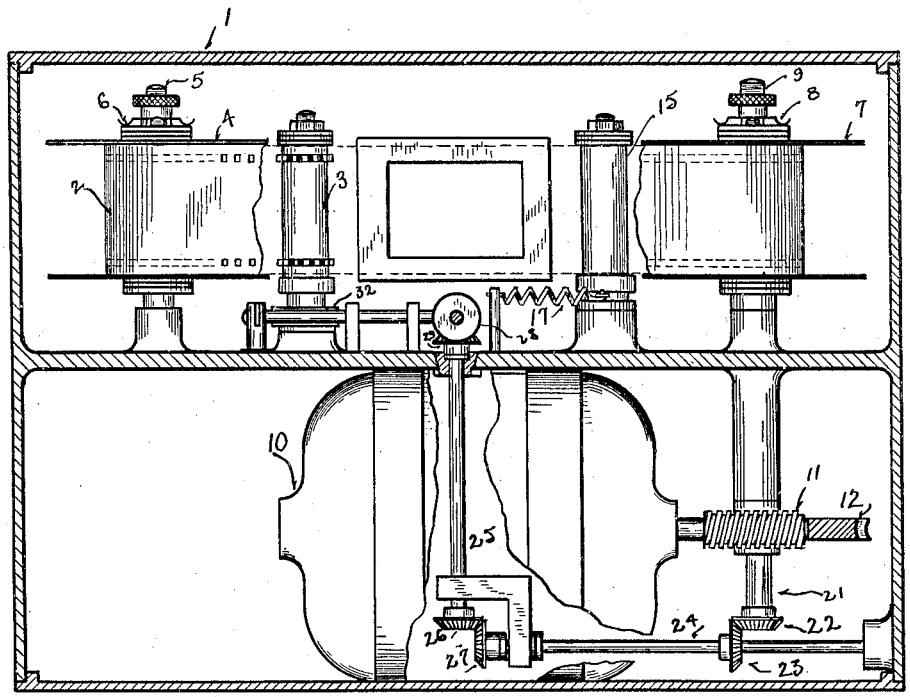
Figure 1 is a rear view of the camera showing parts broken away.
Figure 2:
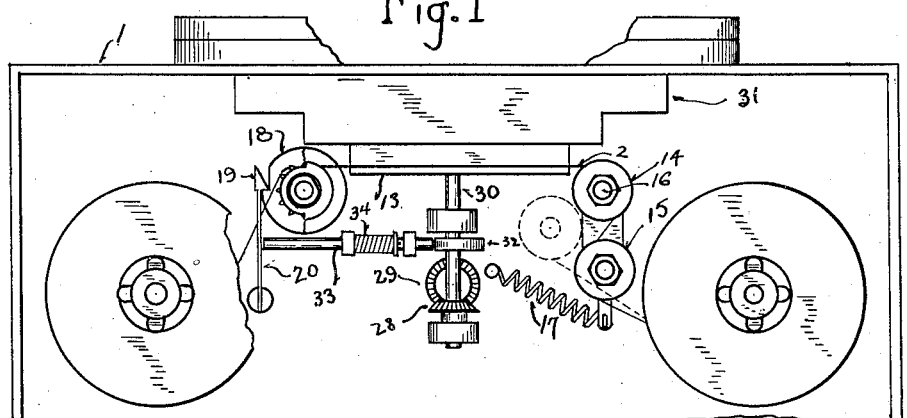
Fig. 2 is a top view of the camera mechanism.
Figure 3:
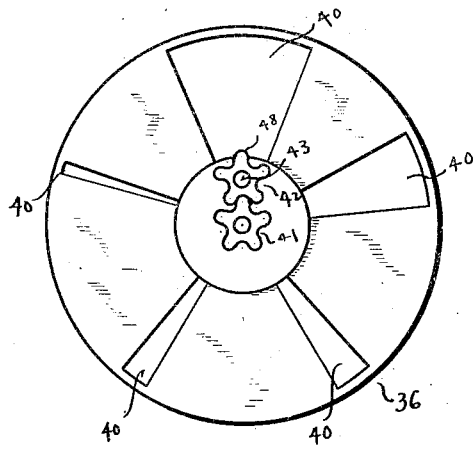
Fig. 3 is a front face view of the front shutter disc.
Figure 4:
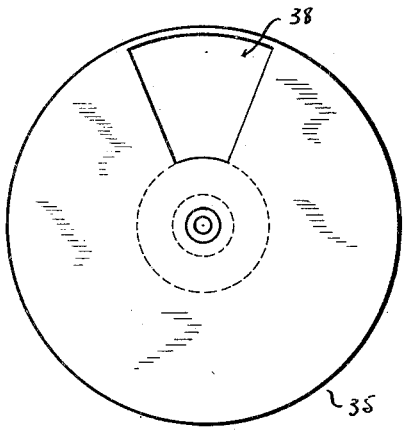
Fig. 4 is a similar view of the rear selector disc.
Figure 5:
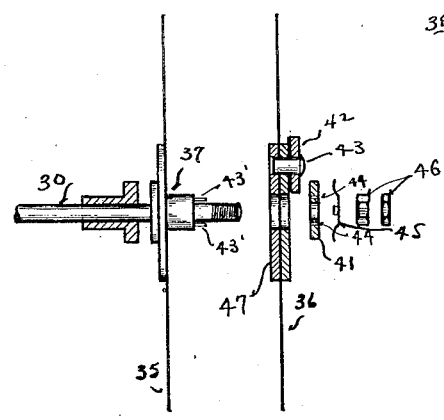
Fig. 5 is a side view of the parts of the shutter disposed in order of their assembly.

While a camera built according to the present description may have a wide variety of uses, the principal purpose of the present invention was to provide a camera for taking a large number of successive pictures under difficult lighting conditions to record a series of events. A specific adaptation of the camera is that of photographing bank robberies. Cameras of the present type are located at strategic points within the bank and are under the control of push buttons, floor treads or other actuating devices located throughout the bank.

The problem of securing photographs under the difficult lighting conditions of the interior of a building makes it desirable to utilize lens of relatively large aperture. This makes it possible to use shutter speeds sufficiently rapid to stop motion. For example, with a stop of F/2.5 it has been found that printing images may be secured with shutter speeds well under 1/100 of a second.

Where the building has areas of deep shadow and others of bright lighting, it is difficult to secure film with highly sensitive emulsions and possessing latitude enough to produce a printing image of subjects in bright light and deep shadows on the same exposure time.

It is contemplated, therefore, to use a lens of a fixed aperture, the depth of focus of which is known, and to use a shutter of variable speeds to take successive pictures varying in exposure time length.

In the specific embodiment herein described, the exposures may be made at five different speeds ranging, for example, from 1/60th to 1/5th of a second. The shorter exposures are sufficiently fast to stop motion of the object and to produce proper exposure of the negative where light values are relatively high.

The longer exposures will produce proper exposures of the negative where light values are relatively low and when the movement of the object is relatively slow.

In the movement of hold-up participants about a banking room, it is evident that each and all of them will become a proper object of exposure upon one or more of the negatives exposed, at some one or more locations in the room.

By the use of high speed lens and recently developed sensitive film with a shutter producing a series of differently timed exposures, satisfactory negatives may be produced through varying light conditions ranging from artificial illumination to bright day light. Thus a record of a hold-up can be made which will serve to identify the participants and aid in their apprehension.

Referring now to the drawings, the camera is provided with a case 1 which encloses the sensitized film 2 and the feeding mechanism.

The film 2 may be standard 35 mm. motion picture film having perforated edges for engaging a sprocket guide roller 3, the function and operation of which will be hereinafter explained in detail.

The film 2 is introduced into the camera on a spool 4, which is free to turn on spindle 5, but is restrained in rotation by a spring 6 just sufficiently to keep the film perforations in register with the sprocket 3 and to maintain proper tension on film, to keep it flat across the focal plane. The film 2 is wound upon spool 7 which is driven by friction, through tension of spring 8, from shaft 9.

Shaft 9 is driven by the motor 10 through worm 11 and worm gear 12. One of the functions of the sprocket guide roller 3 is to guide the film into the focal plane. The film 2 is held flat across the focal plane by tension and by a focal plane plate 13 held against the back of the film by spring tension. The guide roller 14 serves to hold the film in proper alignment as it emerges from the focal plane.

The take-up roller 15 whose spindle is pivoted on spindle 16, is free to swing through an arc in which it is restrained by spring 17. Its purpose is to equalize the travel of the film from the focal plane to the spool 7, by swinging about its pivot with varying tension on the film.

When the motor 10 is started, the film 2 is wound on spool 7 as previously explained.

As film 2 passes around the sprocket guide roller 3 the perforations are in registry with the sprocket teeth and thus turns the guide roller 3. As the circumference of the sprocket guide roller 3 is equal to the length of film used for each exposure, one revolution of the sprocket guide roller 3 will have passed just sufficient film for the next exposure. Attached to sprocket guide roller 3 is a ratchet 18. A pawl 19 actuated by spring 20 drops into the catch of ratchet 18 at each revolution of the sprocket guide roller 3 thus stopping the motion of the film 2, making it ready for the exposure. While the film 2 is stopped in its movement across the focal plane, the spool 7 is still operating and winding up film which has been taken up during the interval of minimum film tension by reason of the spring 17 actuating the take-up roller 15. Before the take-up roller 15 has swung to the end of its travel the sprocket guide roller 3 will have been released as will be hereinafter explained.

As a further precaution against undue strain on the film 2 during the interval in which it is stopped at the focal plane, a friction drive is provided for spool 7 through spring 8, which allows spool 7 to stop when the tension on the film 2 is sufficient to cause spool 7 to slip on its spindle 9.

An extension 21 of shaft 9 carries a miter gear 22 which meshes with the miter gear 23 driving shaft 24. Similarly the shaft 24 drives the shaft 25 through gears 26 and 27, and the shaft 25 transmits its motion through miter gears 28 and 29 to the shutter and camshaft 30. Shutter 31 and cam 32 are mounted on shaft 30 in such relative positions with respect to the rotation of the shaft as to provide for making an exposure of the film while the film is at rest in the focal plane and to provide for movement of the film across the focal plane during the interval that the shutter is closed; thus while an opening of the shutter 31 is passing across the focal plane tube exposing the film 2 to light rays the cam 32 is in a position which allows push rod 33 to be disengaged from pawl 19 by action of spring 34. After the shutter 31 has rotated sufficiently to move the opening of the shutter out of register with the focal plane tube, the cam 32 will have rotated to a position which will cause it to force the push rod 33 against the tension of spring 34 and to engage pawl 19, forcing it out of contact with ratchet 18, thus releasing the sprocket guide roller 3 and thereby allowing film 2 to move across the focal plane to the position of the next exposure, as previously explained. Then the pawl 19 will again engage the ratchet 18 and stop the film 2 across the focal plane, ready for the next exposure.

Figure 6:
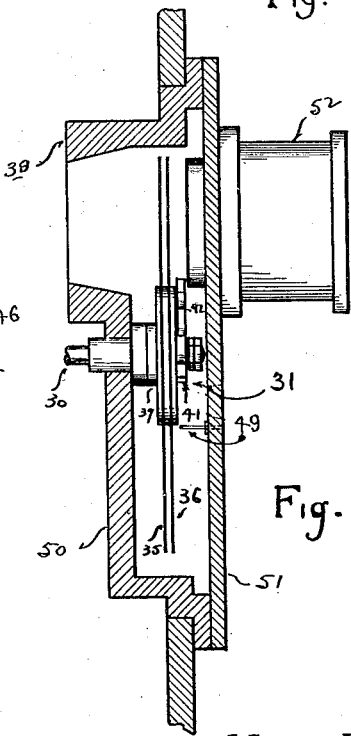
Fig. 6 is a side view of the shutter and lens unit.

The shutter 31 as shown in Fig. 6 is of the rotating type consisting of two discs 35 and 36, the relative positions of which with respect to each other serve to effect exposures at the proper time with respect to the film and to effect a series of exposures of different time values for the purpose already explained.

Disc 35 is rigidly attached to hub 37 which is driven by shaft 30 and rigidly attached thereto. An opening 38 in disc 35 is of proper dimensions to provide for the maximum exposure time value. The remainder of the disc is opaque to prevent exposure at all times except when opening 38 is in register with the focal plane tube 39.

Disc 36 is also mounted on hub 37, but is free to rotate thereon. Several openings 40 of different dimensions are provided in disc 36 and means hereinafter described in detail for rotating disc 36 on the hub 37 are provided for the purpose of causing the openings 40 to register consecutively with the opening 38 in disc 35 during the intervals of exposure. This action provides a series of exposures of different time values and repeats this series during the operation of the camera as herein previously mentioned. The number of such slots in the disc 36 determines the number of different exposures which can be made, for the discs 35 and 36 rotating at a constant speed permit the photographic image to be projected upon the sensitized film 2 through one of the slots, and the length of exposure is controlled directly by the time it takes the selected slot to rotate past the focal plane. Thus the widest slot in the disc 36 permits a much longer exposure than the narrowest.

The disc 35 of the shutter may be called the selector, since it selects through which of the slots 40 in the disc 36 the image will be projected. The disc 35 then has only one slot 38 and that one of approximately the size of the largest of those in the disc 36. When the slot of the disc 35 is in registry with a slot 40 in the disc 36, the solid, imperforate portion of the disc 35 blocks out all light except through the one in registry. As the two discs are rotated by the rotation of the shaft, the image is projected upon the film through the open slots in disc 35 and disc 36.

In order that successive pictures may be automatically taken at varying exposures, means are provided for shifting the disc 36 with respect to the disc 35 so that a different slot than for the prior exposure may be placed in register with the single slot of the disc 35. If it is the next smaller slot, the exposure is correspondingly of a shorter duration.

Where, as in the present embodiment, the disc 36 has five slots for producing five different exposures, the shifting mechanism comprises a pair of five-toothed gears 41 and 42 in mesh with each other, the gear 41 being mounted on the shutter shaft 30 and the gear 42 on spindle 43 on the disc 36 of the shutter and free to turn thereon. Gear 41 fits loosely on shaft 30 to allow for lateral movement, but rotates with shaft 30 by reason of pins 43' mounted in hub 37 and projecting into openings 44 in gear 41. A spring washer 45 between gear 41 and the nuts 46 serves to hold gear 41 in contact with the disc 36 and also to hold the friction hub 47 of disc 36 in contact with disc 35. This friction hub 47 serves to rotate disc 36 with disc 35, but allows the disc 36 to slip on the disc 35 at each revolution of the disc 35 when in its circular travel, one of the teeth 48 of the gear 42 strikes pin 49 which is so set as to cause the gear 42 to turn one fifth of a revolution as it passes the pin 49. As gear 42 is turned one fifth of a revolution with respect to disc 36, the disc 36 is moved one fifth of a revolution with respect to disc 35, thus bringing the next opening 40 in register with opening 38 in disc 35. At the next revolution the next successive opening 40 in disc 36 is brought in register with opening 38 in disc 35 and so on to complete a series of five different time value exposures and a repetition of this series of exposures as long as the camera is in operation.

The shutter and lens unit as shown in Fig. 6 comprises a housing 50, an integral tube 39 for masking the image on the film, a lens mount plate 51, and the lens barrel 52. The plate 51 serves as an enclosing cover for the housing 50 and a support for the lens barrel 52. By removing the plate 51, the parts of the shutter are accessible for cleaning and repairing.

In practice, the distance from the center of the lens to the end of the tube 39 across which the film 2 passes, is very carefully fixed, so that a film passing across said end is in critical focus with the lens.

The advantages of this construction are those of ease of assembly, and the maintenance of critical dimensions permanently within close limits, and the exclusion of light, dirt, and moisture from delicate parts, as well as the interchangeability of a unit from one camera to another.

It is to be understood that a specific embodiment has been described only for purposes of illustration, and that various changes and modifications may be made without departing from the spirit and scope of the appended claims.

I claim:

1. In an automatic camera, in combination, a lens, and a rotary shutter comprising a disc having a single aperture, and a disc having a plurality of apertures of different sizes, said discs being disposed upon the same axis and capable of independent rotation, and means for causing the single aperture of one disc to register with each of the apertures in the other disc, in succession, to produce a plurality of varying photographic exposures.

2. In an automatic camera, in combination, a lens and a rotary shutter comprising a disc having a single aperture, and a disc having a plurality of apertures of different widths, both discs being disposed on the same axis and capable of independent rotation, a pair of star-wheel gears, each disposed upon its respective disc and in meshing engagement with the other, a pin disposed upon a fixed base for engaging a tooth of one of said gears during each cycle of rotation for registering the single aperture of the one disc with each of the apertures of the other disc before the lens, in succession, to produce a plurality of varying photographic exposures.

HARRY H. COLE.